United States Patent
Bowers

(10) Patent No.: US 8,002,331 B2
(45) Date of Patent: Aug. 23, 2011

(54) VEHICLES HAVING UTILITY DUMP BED AND FOLDING SEAT ASSEMBLY

(75) Inventor: Lee N. Bowers, Springfield, OH (US)

(73) Assignee: Honda Motor Company, Ltd., Tokyo (JP)

( * ) Notice: Subject to any disclaimer, the term of this patent is extended or adjusted under 35 U.S.C. 154(b) by 295 days.

(21) Appl. No.: 12/208,753

(22) Filed: Sep. 11, 2008

(65) Prior Publication Data

US 2010/0060026 A1    Mar. 11, 2010

(51) Int. Cl.
*B62D 25/00* (2006.01)
(52) U.S. Cl. ............... 296/183.2; 296/65.01; 296/66
(58) Field of Classification Search ............ 296/66, 296/65.01, 69, 26.01, 182.1, 183.1, 183.2, 296/184.1; 297/15, 378.12
See application file for complete search history.

(56) References Cited

U.S. PATENT DOCUMENTS

| | | | |
|---|---|---|---|
| 976,561 A | 11/1910 | Evans | |
| 1,107,057 A | 8/1914 | Gilmore | |
| 1,158,223 A | 10/1915 | Huschle, Jr. | |
| 1,421,732 A | 7/1922 | Slack | |
| 1,456,247 A | 5/1923 | Miller | |
| 1,554,413 A | 9/1925 | Coppage | |
| 1,726,398 A | 8/1929 | Limbocker | |
| 2,146,107 A | 2/1939 | Biszantz | |
| 2,188,548 A | 1/1940 | Biszantz | |
| 2,797,957 A | 7/1957 | North | |
| 3,097,881 A | 7/1963 | Aguilar | |
| 3,151,906 A | 10/1964 | Roberts | |
| 3,227,488 A | 1/1966 | Kosbab et al. | |
| 3,245,713 A | 4/1966 | Ogilvie | |
| 3,259,423 A | 7/1966 | Minteer | |
| 3,287,058 A | 11/1966 | Wells | |
| 3,325,207 A | 6/1967 | Anderson et al. | |
| 3,326,595 A | 6/1967 | Ogilvie | |
| 3,338,620 A | 8/1967 | Cauvin | |
| 3,550,949 A | 12/1970 | Bonnaud | |
| 3,746,389 A | 7/1973 | Fourrey | |
| 3,806,183 A | 4/1974 | Sieren et al. | |
| 3,927,911 A * | 12/1975 | Rosquist | 297/15 |
| 4,005,902 A | 2/1977 | Balin | |
| 4,124,250 A | 11/1978 | Weinich | |
| 4,126,349 A | 11/1978 | Nelson et al. | |
| 4,139,232 A | 2/1979 | Cerf et al. | |
| 4,226,461 A | 10/1980 | Ackel | |
| 4,337,976 A | 7/1982 | Lapine et al. | |
| 4,394,100 A | 7/1983 | Sperlich | |
| 4,418,852 A | 12/1983 | Grinwald | |
| 4,429,611 A | 2/1984 | Oldham et al. | |

(Continued)

*Primary Examiner* — Glenn Dayoan
*Assistant Examiner* — Melissa A Black
(74) *Attorney, Agent, or Firm* — Ulmer & Berne LLP

(57) ABSTRACT

A vehicle includes a frame, a folding seat assembly, and a utility bed. The utility bed is attached to the frame and is moveable with respect to the frame between a hauling position and a dumping position. The folding seat assembly is moveable between an erected position and a collapsed position. The utility bed comprises a bed floor and a cargo lid. The bed floor includes a first cargo supporting surface and defines an aperture. The cargo lid is movable between a closed position and an opened position. In the closed position, the cargo lid at least substantially covers the aperture. In the opened position, the cargo lid facilitates selective passage of at least a portion of the folding seat assembly into the aperture when both the utility bed is in the hauling position and the folding seat assembly is in the erected position.

19 Claims, 8 Drawing Sheets

U.S. PATENT DOCUMENTS

| | | | |
|---|---|---|---|
| 4,519,646 A * | 5/1985 | Leitermann et al. ............ 297/15 |
| 4,573,731 A | 3/1986 | Knaack et al. |
| 4,620,741 A | 11/1986 | Hanemaayer |
| 4,695,087 A | 9/1987 | Hollrock |
| 4,733,898 A | 3/1988 | Williams |
| 4,772,063 A | 9/1988 | Amy |
| 4,773,898 A | 9/1988 | Begouen |
| 4,779,917 A | 10/1988 | Campbell et al. |
| 4,877,282 A | 10/1989 | Yamauchi |
| 4,915,437 A | 4/1990 | Cherry |
| 4,932,706 A | 6/1990 | Wainwright et al. |
| 4,932,709 A | 6/1990 | Wainwright |
| 4,941,703 A | 7/1990 | Curry |
| 5,002,325 A | 3/1991 | Fought et al. |
| 5,025,964 A | 6/1991 | Phirippidis |
| 5,026,107 A | 6/1991 | Hess |
| 5,056,846 A | 10/1991 | Tanaka |
| 5,061,002 A | 10/1991 | Saso |
| 5,080,417 A | 1/1992 | Kanai |
| 5,125,710 A | 6/1992 | Gianelo |
| 5,195,795 A | 3/1993 | Cannera et al. |
| 5,234,089 A | 8/1993 | Itomi et al. |
| 5,238,284 A | 8/1993 | Whitaker |
| 5,239,934 A | 8/1993 | Miller et al. |
| 5,251,947 A | 10/1993 | Kirila, II et al. |
| 5,257,846 A | 11/1993 | Kanai et al. |
| 5,269,581 A | 12/1993 | Odagaki et al. |
| 5,271,657 A | 12/1993 | Lockett |
| 5,382,069 A | 1/1995 | Chambers |
| 5,441,183 A | 8/1995 | Frenzel |
| 5,454,613 A | 10/1995 | Weber et al. |
| 5,482,346 A | 1/1996 | Lesourd |
| 5,482,349 A | 1/1996 | Richter et al. |
| 5,492,386 A | 2/1996 | Callum |
| 5,498,048 A | 3/1996 | Shelby, Jr. |
| 5,501,384 A | 3/1996 | Wisniewski |
| 5,513,868 A | 5/1996 | Barr |
| 5,527,087 A | 6/1996 | Takeda et al. |
| 5,533,774 A | 7/1996 | Cavanaugh |
| 5,542,745 A | 8/1996 | Takeda et al. |
| 5,564,768 A | 10/1996 | Saffold |
| 5,564,776 A | 10/1996 | Schlachter |
| 5,567,000 A | 10/1996 | Clare |
| 5,568,890 A | 10/1996 | Magee et al. |
| 5,570,931 A | 11/1996 | Kargilis et al. |
| 5,590,925 A | 1/1997 | Banks, Sr. |
| 5,632,520 A | 5/1997 | Butz |
| 5,636,890 A | 6/1997 | Cooper |
| 5,657,916 A | 8/1997 | Tackett |
| 5,687,895 A | 11/1997 | Allison et al. |
| 5,700,055 A | 12/1997 | Davidson et al. |
| 5,702,145 A | 12/1997 | Fowler et al. |
| 5,743,589 A | 4/1998 | Felker |
| 5,795,017 A | 8/1998 | Zimmerman et al. |
| 5,826,931 A | 10/1998 | Perlman et al. |
| 5,839,773 A | 11/1998 | Ban et al. |
| 5,845,952 A | 12/1998 | Albertini et al. |
| 5,853,116 A | 12/1998 | Schreiner |
| 5,868,451 A | 2/1999 | Uno et al. |
| 5,871,255 A | 2/1999 | Harland et al. |
| 5,879,053 A | 3/1999 | Lux et al. |
| 5,890,758 A | 4/1999 | Pone et al. |
| 5,895,086 A | 4/1999 | Carico |
| 5,897,154 A | 4/1999 | Albertini et al. |
| 5,927,783 A | 7/1999 | Baka |
| 5,934,732 A | 8/1999 | Jakubiec |
| 5,941,602 A | 8/1999 | Sturt et al. |
| 5,961,172 A | 10/1999 | Ament et al. |
| 5,971,462 A | 10/1999 | Bell et al. |
| 5,971,467 A | 10/1999 | Kayumi et al. |
| 5,975,612 A | 11/1999 | Macey et al. |
| 5,979,725 A | 11/1999 | Lehrman |
| 5,979,962 A | 11/1999 | Valentin et al. |
| 5,979,964 A | 11/1999 | Ban et al. |
| 5,996,868 A | 12/1999 | Paradis |
| 6,000,751 A | 12/1999 | Kato et al. |
| 6,003,921 A | 12/1999 | Tozuka |
| 6,012,744 A | 1/2000 | Wilson et al. |
| 6,012,754 A | 1/2000 | Clare et al. |
| 6,019,413 A | 2/2000 | Scraver et al. |
| 6,027,155 A | 2/2000 | Wisniewski et al. |
| 6,056,177 A | 5/2000 | Schneider |
| 6,059,141 A | 5/2000 | Wojnowski |
| 6,065,794 A | 5/2000 | Schlachter |
| 6,070,934 A | 6/2000 | Schaefer et al. |
| 6,073,985 A | 6/2000 | Keip |
| 6,089,641 A | 7/2000 | Mattarella et al. |
| 6,092,852 A | 7/2000 | Lawrence |
| 6,099,072 A | 8/2000 | Sturt et al. |
| 6,102,464 A | 8/2000 | Schneider et al. |
| 6,106,046 A | 8/2000 | Reichel |
| 6,113,172 A | 9/2000 | Chaloult et al. |
| 6,113,191 A | 9/2000 | Seibold |
| 6,123,380 A | 9/2000 | Sturt et al. |
| 6,129,401 A | 10/2000 | Neag et al. |
| 6,129,404 A | 10/2000 | Mattarella et al. |
| 6,145,907 A | 11/2000 | Maruyama et al. |
| 6,155,625 A | 12/2000 | Felix |
| 6,174,017 B1 | 1/2001 | Salani et al. |
| 6,176,535 B1 | 1/2001 | Chaloult et al. |
| 6,196,613 B1 | 3/2001 | Arai |
| 6,199,930 B1 | 3/2001 | Riley |
| 6,199,951 B1 | 3/2001 | Zeile et al. |
| 6,209,943 B1 | 4/2001 | Neale et al. |
| 6,231,100 B1 | 5/2001 | Fournier |
| 6,231,101 B1 | 5/2001 | Kamida et al. |
| 6,234,553 B1 | 5/2001 | Eschelbach et al. |
| 6,234,559 B1 | 5/2001 | Block et al. |
| 6,237,211 B1 | 5/2001 | Clare et al. |
| 6,237,487 B1 | 5/2001 | Davis |
| 6,237,981 B1 * | 5/2001 | Selleck ............................ 296/66 |
| 6,241,137 B1 | 6/2001 | Corr |
| 6,244,645 B1 | 6/2001 | Baumert et al. |
| 6,247,741 B1 | 6/2001 | Seel et al. |
| 6,254,162 B1 | 7/2001 | Faber et al. |
| 6,267,427 B1 | 7/2001 | Ziehl |
| 6,270,141 B2 | 8/2001 | Moon et al. |
| 6,279,982 B1 | 8/2001 | Nishimura et al. |
| 6,283,526 B1 | 9/2001 | Keough et al. |
| 6,296,289 B1 | 10/2001 | Gehring et al. |
| 6,302,465 B1 | 10/2001 | Faber et al. |
| 6,318,784 B2 | 11/2001 | Nishide |
| 6,328,364 B1 | 12/2001 | Darbishire |
| 6,328,365 B1 | 12/2001 | Adsit |
| 6,328,366 B1 | 12/2001 | Foster et al. |
| 6,375,255 B1 | 4/2002 | Maruta et al. |
| 6,406,084 B1 | 6/2002 | de Campos et al. |
| 6,416,104 B1 | 7/2002 | Fisher et al. |
| 6,416,107 B1 | 7/2002 | Kanaguchi et al. |
| 6,422,567 B1 | 7/2002 | Mastrangelo et al. |
| 6,435,589 B2 | 8/2002 | Shimizu et al. |
| 6,435,590 B2 | 8/2002 | Miyahara et al. |
| 6,439,633 B2 | 8/2002 | Nemoto |
| 6,450,579 B1 | 9/2002 | Nylander et al. |
| 6,455,948 B1 | 9/2002 | Berger |
| 6,464,297 B2 | 10/2002 | Garrido et al. |
| 6,467,829 B2 | 10/2002 | Kaluszka et al. |
| 6,471,277 B1 | 10/2002 | Scensny et al. |
| 6,474,715 B2 | 11/2002 | Fukushima et al. |
| 6,478,355 B1 | 11/2002 | Van Eden et al. |
| 6,481,773 B1 | 11/2002 | Salani et al. |
| 6,499,787 B2 | 12/2002 | Jach et al. |
| 6,502,886 B1 | 1/2003 | Bleau et al. |
| 6,520,581 B1 | 2/2003 | Tame |
| 6,533,339 B1 | 3/2003 | Bettin et al. |
| 6,536,843 B1 | 3/2003 | Severinski et al. |
| 6,550,837 B1 | 4/2003 | Preiss |
| 6,557,882 B2 | 5/2003 | Harrington |
| 6,591,554 B2 | 7/2003 | Kumer, Jr. |
| 6,592,165 B2 | 7/2003 | Ament et al. |
| 6,601,901 B1 | 8/2003 | Schambre et al. |
| 6,609,745 B2 | 8/2003 | Miyahara et al. |
| 6,623,060 B2 | 9/2003 | Gehring et al. |
| 6,629,714 B2 | 10/2003 | Campbell |
| 6,631,946 B1 | 10/2003 | Neale |
| 6,634,691 B2 | 10/2003 | Henderson |
| 6,637,819 B2 | 10/2003 | Tame |

| Patent No. | Date | Name |
|---|---|---|
| 6,641,013 B2 | 11/2003 | Dise |
| 6,644,709 B2 | 11/2003 | Inagaki et al. |
| 6,644,730 B2 | 11/2003 | Sugiura et al. |
| 6,648,395 B2 | 11/2003 | Hoshino |
| 6,659,525 B2 | 12/2003 | Delavalle et al. |
| 6,672,640 B2 | 1/2004 | Gehring et al. |
| 6,672,662 B1 | 1/2004 | Balk |
| 6,676,184 B2 | 1/2004 | Gehring et al. |
| 6,682,120 B2 | 1/2004 | Kamida et al. |
| 6,695,391 B1 | 2/2004 | Votruba et al. |
| 6,698,829 B1 | 3/2004 | Freijy et al. |
| 6,698,837 B2 | 3/2004 | Pejathaya et al. |
| 6,705,657 B2 | 3/2004 | Kutomi et al. |
| 6,705,658 B2 | 3/2004 | Jach et al. |
| 6,709,040 B1 | 3/2004 | Drew et al. |
| 6,719,348 B1 | 4/2004 | Song |
| 6,733,060 B1 | 5/2004 | Pavkov et al. |
| 6,742,825 B1 | 6/2004 | Macaulay |
| 6,746,083 B2 | 6/2004 | Drew et al. |
| 6,793,260 B2 | 9/2004 | Crean |
| 6,793,265 B2 | 9/2004 | Kamida et al. |
| 6,811,196 B2 | 11/2004 | Gammon |
| 6,817,660 B2 | 11/2004 | Ito et al. |
| 6,817,669 B2 | 11/2004 | Roth et al. |
| 6,820,911 B2 | 11/2004 | Furui |
| 6,820,914 B2 | 11/2004 | Behrends et al. |
| 6,837,530 B2 | 1/2005 | Rudberg et al. |
| 6,843,526 B2 | 1/2005 | Honda et al. |
| 6,860,545 B1 | 3/2005 | Ingram et al. |
| 6,869,138 B2 | 3/2005 | Rhodes et al. |
| 6,874,667 B2 | 4/2005 | Dykstra et al. |
| 6,874,840 B2 | 4/2005 | Neale |
| 6,880,875 B2 | 4/2005 | McClure et al. |
| 6,883,851 B2 | 4/2005 | McClure et al. |
| 6,890,015 B2 | 5/2005 | Carlsson et al. |
| 6,896,309 B2 | 5/2005 | Satoh et al. |
| 6,905,159 B1 * | 6/2005 | Saito et al. ............... 296/65.01 |
| 6,918,625 B2 | 7/2005 | Storto et al. |
| 6,921,129 B2 | 7/2005 | Katz et al. |
| 6,926,347 B2 | 8/2005 | Fior et al. |
| 6,926,348 B2 | 8/2005 | Krueger et al. |
| 6,932,424 B2 | 8/2005 | Rhodes et al. |
| 6,955,386 B2 | 10/2005 | Rhodes et al. |
| 6,962,684 B2 | 11/2005 | Kawazu et al. |
| 6,966,593 B2 | 11/2005 | Plentis et al. |
| 6,974,174 B2 | 12/2005 | Imajo et al. |
| 6,983,985 B2 | 1/2006 | McGowan et al. |
| 6,986,542 B2 | 1/2006 | Imajo et al. |
| 6,988,768 B2 | 1/2006 | Kutomi et al. |
| 6,997,500 B2 | 2/2006 | Horsford et al. |
| 6,997,506 B2 | 2/2006 | Hecker |
| 7,000,968 B2 | 2/2006 | Welch et al. |
| 7,011,352 B2 | 3/2006 | Matsuoka et al. |
| 7,014,260 B2 | 3/2006 | Moriyama et al. |
| 7,029,063 B2 | 4/2006 | Holdampf |
| RE39,101 E | 5/2006 | Miyahara et al. |
| 7,040,685 B2 | 5/2006 | Sumida et al. |
| 7,040,702 B2 | 5/2006 | Yamada et al. |
| 7,048,330 B2 | 5/2006 | Daniel |
| 7,055,881 B2 | 6/2006 | Kindred |
| 7,063,368 B2 | 6/2006 | Kayumi |
| 7,066,519 B2 | 6/2006 | Rhodes et al. |
| 7,066,532 B2 | 6/2006 | Schoemann |
| 7,070,240 B2 | 7/2006 | Schmitt et al. |
| 7,077,451 B2 | 7/2006 | Rhodes et al. |
| 7,090,274 B1 | 8/2006 | Khan et al. |
| 7,097,224 B2 | 8/2006 | Lester et al. |
| 7,108,306 B2 | 9/2006 | Suda et al. |
| 7,108,323 B2 | 9/2006 | Welch et al. |
| 7,118,017 B1 | 10/2006 | Geraghty et al. |
| 7,118,150 B2 | 10/2006 | Bruford et al. |
| 7,118,151 B2 | 10/2006 | Bejin et al. |
| 7,121,606 B2 | 10/2006 | Khan et al. |
| 7,128,358 B2 | 10/2006 | Perin |
| 7,152,900 B2 | 12/2006 | Trombley et al. |
| 7,156,439 B2 | 1/2007 | Bejin et al. |
| 7,159,922 B2 | 1/2007 | Iyoda et al. |
| 7,179,040 B2 | 2/2007 | Masuda et al. |
| 7,192,073 B2 | 3/2007 | Nagamoto et al. |
| 7,192,088 B1 | 3/2007 | Trombley et al. |
| 7,201,425 B2 | 4/2007 | Tsujibayashi et al. |
| 7,201,437 B2 | 4/2007 | Freijy |
| 7,201,724 B2 | 4/2007 | Jarl et al. |
| 7,210,741 B2 | 5/2007 | Tabellion et al. |
| 7,213,861 B2 | 5/2007 | Yokoyama et al. |
| 7,216,914 B2 | 5/2007 | Lovell |
| 7,216,916 B2 | 5/2007 | Czerwinski et al. |
| 7,240,950 B2 | 7/2007 | Fourrey et al. |
| 7,252,320 B2 | 8/2007 | Tsujibayashi et al. |
| 7,255,384 B2 | 8/2007 | Saberan et al. |
| 7,270,360 B2 | 9/2007 | Frasure et al. |
| 7,416,238 B2 * | 8/2008 | Houston ........................ 296/66 |
| 7,510,235 B2 * | 3/2009 | Kobayashi et al. ...... 296/193.01 |
| 7,735,896 B2 * | 6/2010 | Kubota ........................ 296/69 |
| 2005/0057081 A1 | 3/2005 | Kahn et al. |
| 2005/0140159 A1 | 6/2005 | Barber |
| 2006/0103159 A1 | 5/2006 | Saigal et al. |
| 2006/0140159 A1 | 6/2006 | Choi et al. |
| 2006/0170235 A1 | 8/2006 | Oilar et al. |
| 2006/0175874 A1 | 8/2006 | Welch et al. |
| 2006/0244279 A1 | 11/2006 | Ranka et al. |
| 2007/0024077 A1 | 2/2007 | McClintock |
| 2007/0029831 A1 | 2/2007 | Frasure et al. |
| 2007/0158968 A1 | 7/2007 | Chandler et al. |
| 2007/0210601 A1 | 9/2007 | Phillips et al. |
| 2007/0290521 A1 | 12/2007 | Houston |

* cited by examiner

US 8,002,331 B2

VEHICLES HAVING UTILITY DUMP BED AND FOLDING SEAT ASSEMBLY

TECHNICAL FIELD

A vehicle includes a frame, a folding seat assembly, and a utility bed. The utility bed is attached to the frame and is moveable with respect to the frame between a hauling position and a dumping position. The folding seat assembly is moveable between an erected position and a collapsed position.

BACKGROUND

Certain conventional vehicles include a utility bed which is movable between a hauling position and a dumping position. Such a utility bed is often referred to as a "dump bed" and is suitable to selectively facilitate transportation of cargo.

SUMMARY

In accordance with one embodiment, a vehicle comprises a frame, a folding seat assembly, and a utility bed. The folding seat assembly is attached to the frame and is moveable with respect to the frame between an erected position and a collapsed position. The utility bed is attached to the frame and is moveable with respect to the frame between a hauling position and a dumping position. The utility bed comprises a bed floor and a cargo lid. The bed floor comprises a first cargo supporting surface and defines an aperture. The cargo lid is movable between a closed position and an opened position. In the closed position, the cargo lid at least substantially covers the aperture. In the opened position, the cargo lid facilitates selective passage of at least a portion of the folding seat assembly into the aperture when both the utility bed is in the hauling position and the folding seat assembly is in the erected position.

In accordance with another embodiment, a vehicle comprises a frame, a utility bed, a folding seat assembly, and an interlock arrangement. The utility bed is attached to the frame and is moveable with respect to the frame between a hauling position and a dumping position. The utility bed comprises a bed floor and a cargo lid. The bed floor defines an aperture. The folding seat assembly is moveable between an erected position and a collapsed position. The cargo lid is movable between a closed position and an opened position. In the closed position, the cargo lid at least substantially covers the aperture. In the opened position, the cargo lid facilitates selective passage of at least a portion of the folding seal assembly into the aperture when both the utility bed is in the hauling position and the folding seat assembly is in the erected position. The interlock arrangement is configured to prevent movement of the utility bed from the hauling position to the dumping position when the folding seat assembly is in the erected position.

In accordance with yet another embodiment, a vehicle comprises a frame, a forward-facing seat, a utility bed, a folding seat assembly, and a roll bar assembly. The forward-facing seat is coupled with the frame and is configured to support a forward-facing person. The utility bed is attached to the frame and is moveable with respect to the frame between a hauling position and a dumping position. The utility bed comprises a bed floor and a cargo lid. The bed floor defines an aperture. The folding seat assembly is moveable between an erected position and a collapsed position. The folding seat assembly, when in the erected position, is configured to support a rearward-seated person. The roll bar assembly is attached to the frame and is configured to simultaneously protect persons respectively seated upon each of the forward-facing seat and the folding seat assembly. The cargo lid is movable between a closed position and an opened position. In the closed position, the cargo lid at least substantially covers the aperture. In the opened position, the cargo lid facilitates selective passage of at least a portion of the folding seat assembly into the aperture when both the utility bed is in the hauling position and the folding seat assembly is in the erected position.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
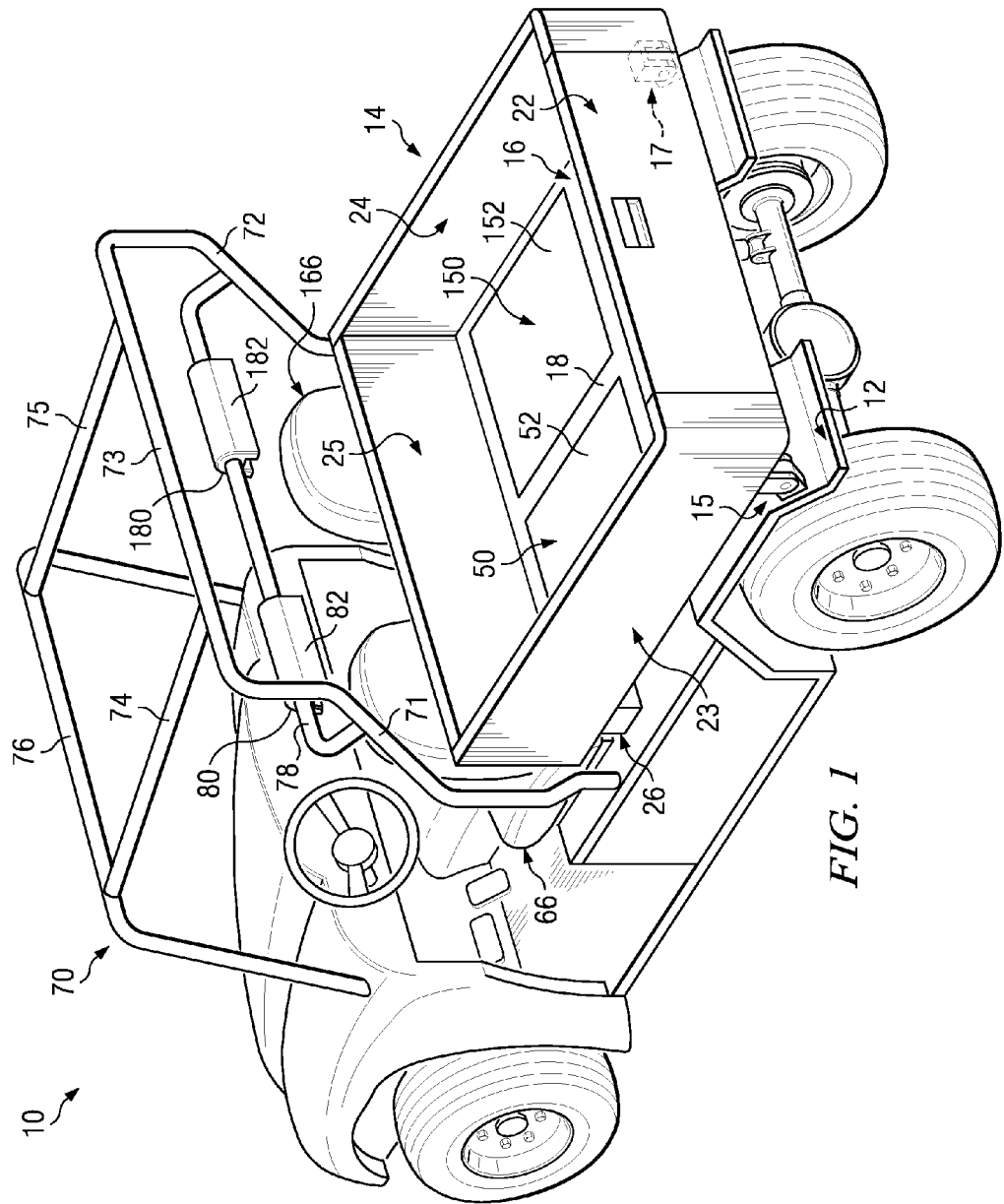
FIG. 1 is a rear perspective view depicting a utility vehicle in accordance with one embodiment, wherein a utility bed is in a hauling position, cargo lids are in closed positions, and folding seat assemblies are in collapsed positions, and wherein certain hidden components are shown in dashed lines.

Embodiments are hereinafter described in detail in connection with the views of FIGS. 1-7, wherein like numbers indicate the same or corresponding elements throughout the views. A dump-type vehicle includes a utility bed which can be used to facilitate hauling of cargo by the vehicle, and selective dumping of cargo from the utility bed of the vehicle. In one embodiment, a dump-type vehicle can comprise a light utility vehicle, such as the utility vehicle 10 shown in FIGS. 1-7. In other embodiments, a dump-type vehicle can comprise any of a variety of other types of vehicles having a utility bed capable of dumping such as, for example, a pickup truck, a dump truck, an all terrain vehicle ("ATV"), and a golf cart, for example.

Referring again to FIGS. 1-7, the utility vehicle 10 can include a frame 12. The frame 12 can include any of a variety of structural and/or decorative rails, panels, and/or other components which are typically, although not necessarily, formed from metal (e.g., steel and/or aluminum). The utility vehicle 10 can also include a utility bed 14 which is attached to the frame 12, either directly or indirectly, and such as through use of hinge assemblies 15 and 17 shown in FIG. 1. The hinge assemblies 15, 17 can facilitate pivotable movement of the utility bed 14 with respect to the frame 12 of the utility vehicle 10, and between a hauling position, (shown in FIGS. 1, 3-4, and 6-7) and a dumping position (shown in FIGS. 2 and 5). When the utility bed 14 is in the hauling position, a front portion of the utility bed 14 can rest upon a rest surface 27 provided by a rest structure 26 which is attached to the frame 12 of the utility vehicle 10. In one embodiment, the rest structure 26 can comprise a rigid structure (e.g., formed from sheet metal), though in another embodiment, a rest structure can comprise a resilient element (e.g., a rubber bumper). It will be appreciated that any of a variety of known conventional mechanisms or methods (none shown) can be provided to facilitate manual or powered movement of the utility bed 14 between the hauling and dumping positions under control of an operator of the utility vehicle 10.

In the embodiment of FIGS. 1-7, the utility bed 14 is shown to comprise a bed floor 16. The bed floor 16 is shown to comprise a cargo supporting surface 18. The cargo supporting surface 18 is configured to directly contact and provide underlying support for cargo (not shown) disposed within the utility bed 14. The utility bed 14 is also shown to include multiple side walls 23, 24, and 25 extending generally perpendicularly from the bed floor 16 or locations adjacent to the bed floor 16. A tailgate 22 can also be pivotally coupled with respect to the bed floor 16. When the utility bed is in the hauling position (shown in FIGS. 1, 3-4, and 6-7), it will be appreciated that the side walls 23, 24, and 25 can cooperate with the bed floor 16 to retain cargo within the utility bed 14. The tailgate 22, when closed (as shown in FIGS. 1-7), can also cooperate with the side walls 23, 24, and 25 and the bed floor 16 to retain cargo within the utility bed 14. It will be appreciated that the tailgate 22 can be selectively opened to facilitate loading of the utility bed 14 and/or to allow cargo (e.g., dirt) to pour from the utility bed 14 when the utility bed 14 is in a dumping position (shown in FIGS. 2 and 5). In another embodiment, it will be appreciated that a tailgate might be rigidly affixed with respect to a bed floor of a utility bed and thus might not be capable of being selectively opened by an operator. In yet another alternative embodiment, it will be appreciated that one or more of the side walls (e.g., 23 and/or 24) of a utility bed might be capable of being selectively opened (e.g., like tailgate 22) by an operator. In still another alternative embodiment, it will be appreciated that a utility bed might not include any tailgate and/or sidewalls and might, for example, comprise a flat-bed type configuration (e.g., commonly used for hauling small vehicles).

A bed floor of a utility bed can define one or more apertures which can selectively facilitate access to one or more folding seat assemblies provided beneath the bed floor. For example, with reference to FIGS. 3 and 7, the bed floor 16 is shown to define apertures 20 and 120. The aperture 20 can facilitate access to a folding seat assembly 30, and the aperture 120 can facilitate access to a folding seat assembly 130. In an alternative embodiment, a single aperture in a bed floor of a utility bed can facilitate access to multiple (e.g., two) folding seat assemblies. Though the utility vehicle 10 is shown to comprise two folding seat assemblies (i.e., 30 and 130), it will be appreciated that a vehicle can alternatively comprise a single such folding seat assembly or more than two such folding seat assemblies.

Figure 2:
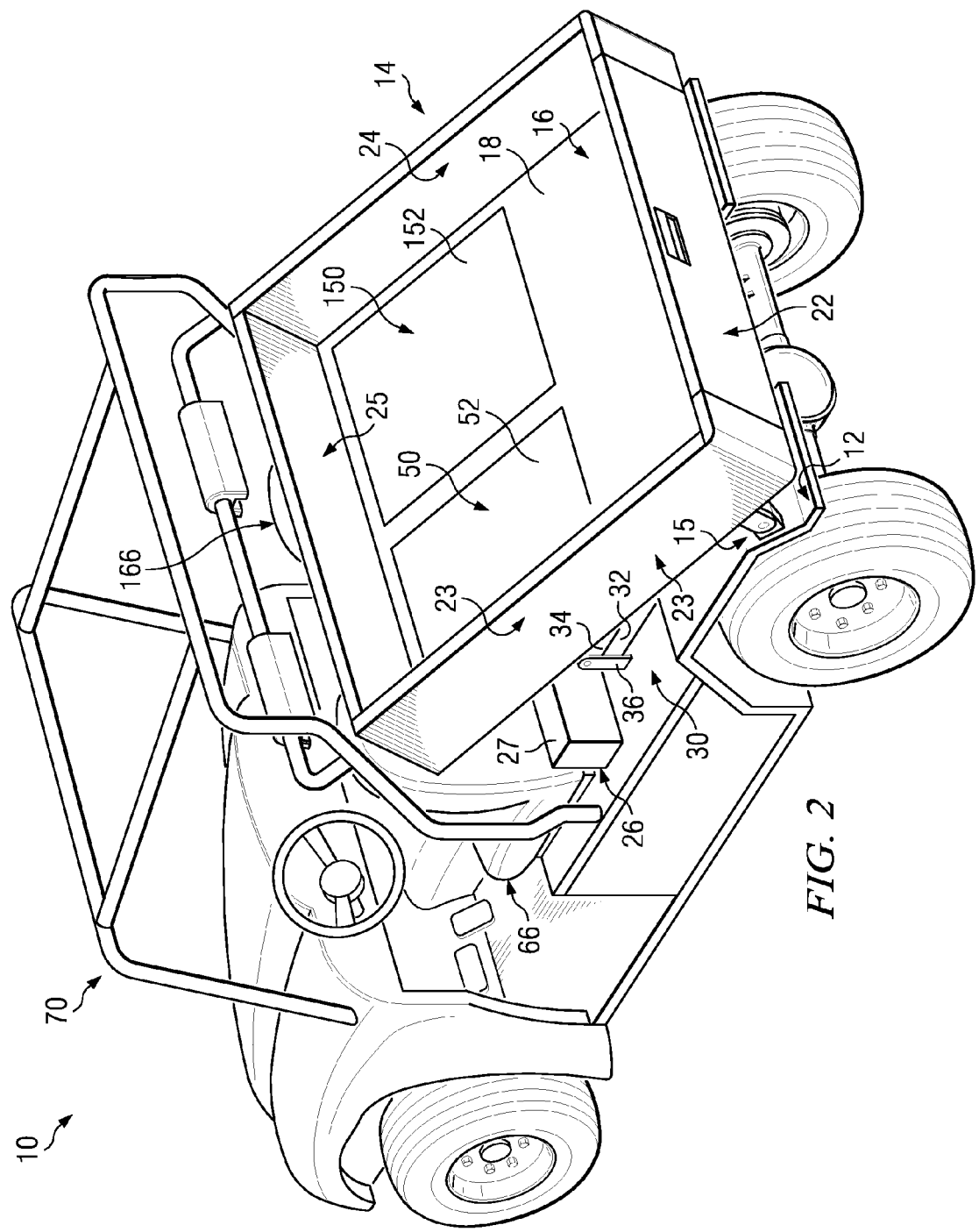
FIG. 2 is a rear perspective view depicting the utility vehicle of FIG. 1, wherein the utility bed is in a dumping position, cargo lids are in closed positions, and folding seat assemblies are in collapsed positions.
Figure 3:
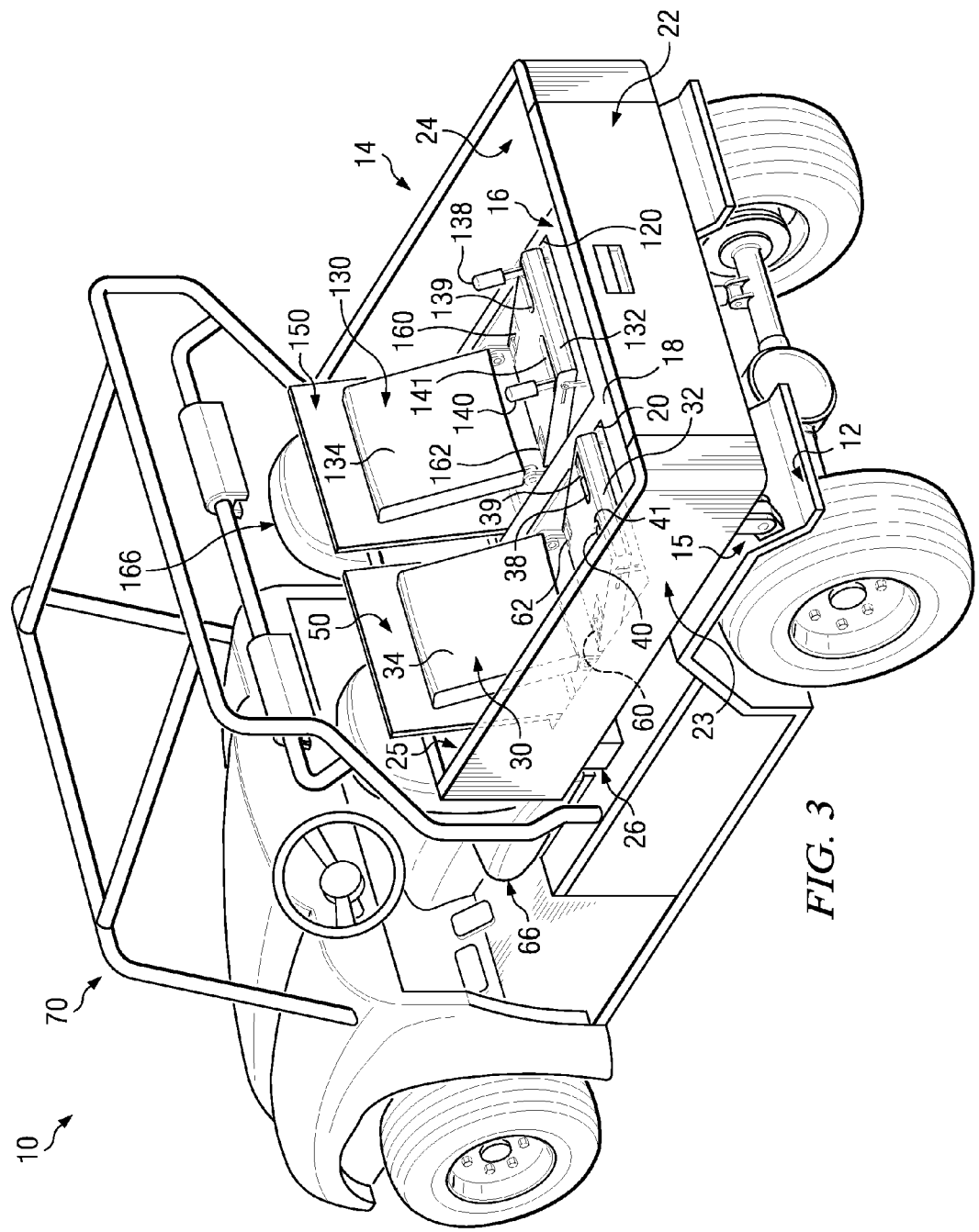
FIG. 3 is a rear perspective view depicting the utility vehicle of FIG. 1, wherein the utility bed is in a hauling position, cargo lids are in opened positions, and folding seat assemblies are in erected positions, and wherein certain hidden components are shown in dashed lines.
Figure 4:
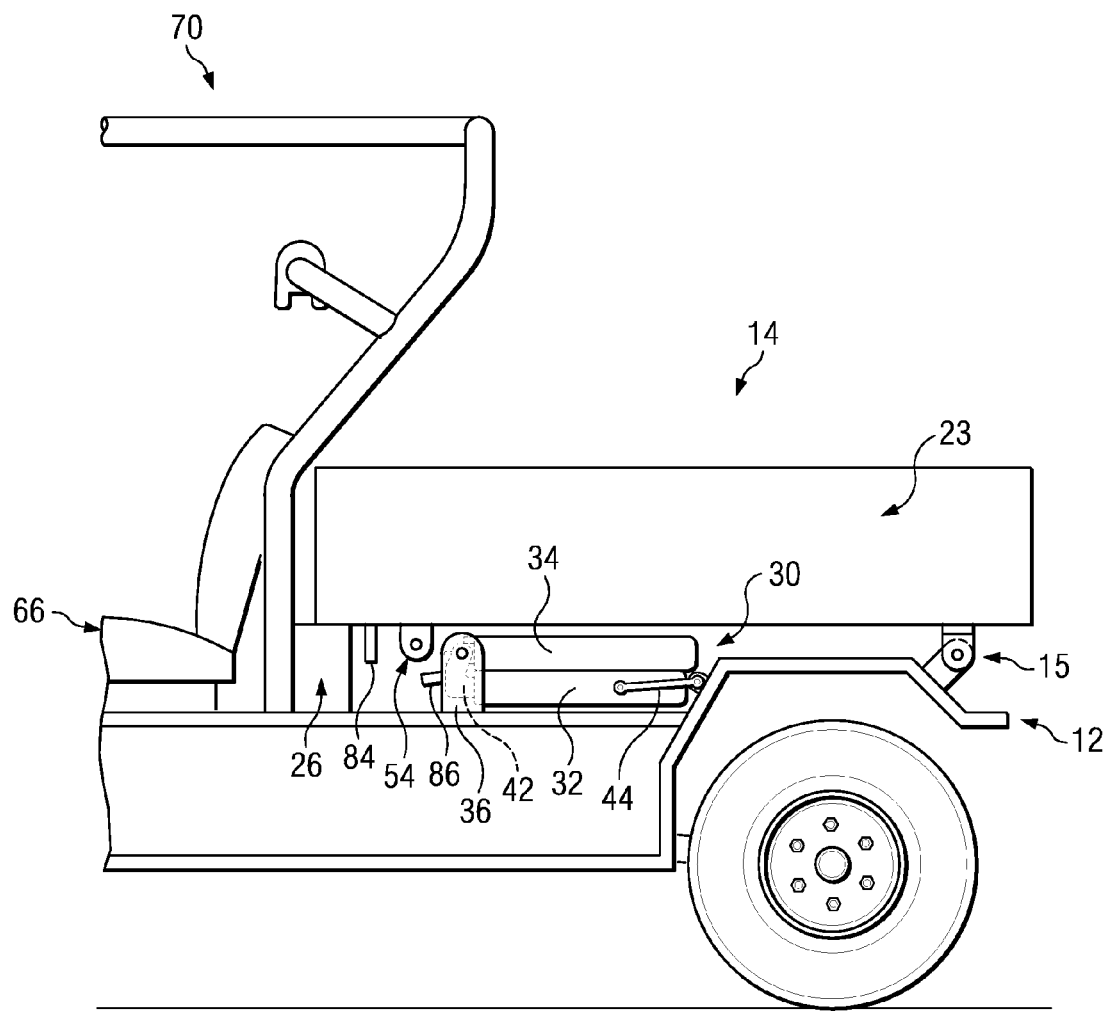
FIG. 4 is an enlarged side elevational view depicting a portion of the utility vehicle of FIG. 1, wherein certain hidden components are shown in dashed lines.
Figure 5:
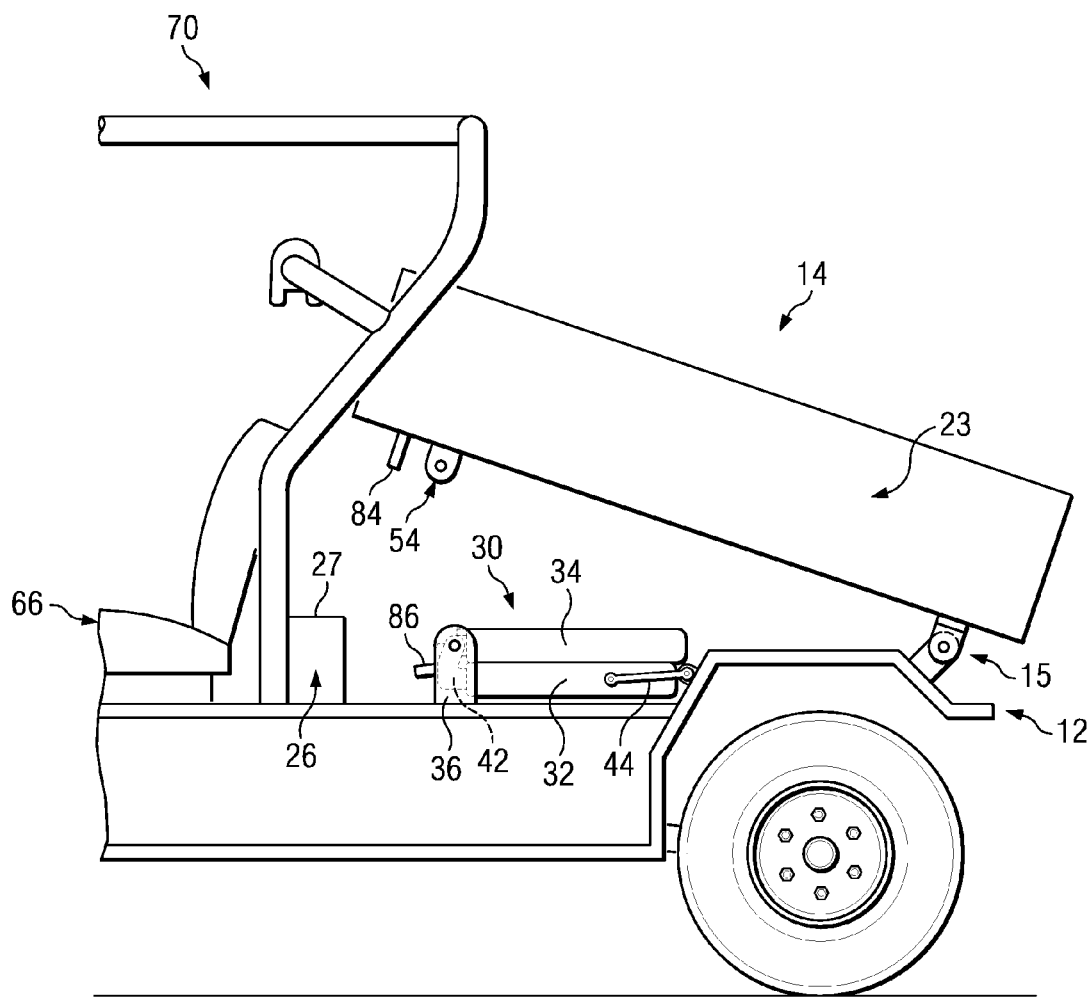
FIG. 5 is an enlarged side elevational view depicting a portion of the utility vehicle of FIG. 2, wherein certain hidden components are shown in dashed lines.

A utility bed can include one or more cargo lids for selectively covering the aperture(s) defined by a bed floor of the utility bed. For example, with reference again to the embodiment of FIGS. 1-7, the utility bed 14 is shown to comprise cargo lids 50 and 150. Each of the cargo lids 50, 150 can be movable between a closed position (shown in FIGS. 1-2 and 4-5) and an opened position (shown in FIGS. 3 and 6-7). In the closed position, the cargo lid 50 at least substantially (i.e., substantially or entirely) covers the aperture 20, as shown in FIGS. 1-2. Likewise, in the closed position, the cargo lid 150 at least substantially (i.e., substantially or entirely) covers the aperture 120, as also shown in FIGS. 1-2. In the opened position, the cargo lids 50, 150 can facilitate selective passage of at least a portion of the respective folding seat assemblies 30, 130 into the respective apertures 20, 120 when both the utility bed 14 is in the hauling position and the respective folding seat assembly 30, 130 is in the erected position, as shown in FIG. 3, for example.

In one embodiment, the cargo lid 50 can be hingedly coupled with the bed floor 16, such as though use of a hinge assembly 54 shown in FIGS. 4-7. The cargo lid 150 can be hingedly coupled with the bed floor 16 in a similar manner. However, in other embodiments, it will be appreciated that a cargo lid might be movably attached to a bed floor or other portion of a utility bed in any of a variety of other suitable arrangements, or might not be attached to a bed floor or other portion of a utility bed.

The cargo lid 50 is shown to comprise a cargo supporting surface 52. Likewise, the cargo lid 150 is shown to comprise a cargo supporting surface 152. It will be appreciated that the cargo supporting surfaces 52 and 152 can be generally coplanar with the cargo supporting surface 18 of the bed floor 16 when the cargo lids 50, 150 are in the closed position as shown in FIGS. 1-2. When the cargo lids are in the closed position, as shown in FIGS. 1-2, each of the cargo supporting surfaces 52, 152 can be configured to directly contact and provide underlying support for cargo within the utility bed 14. It will be appreciated that any of a variety of handles or other controls (not shown) can be provided, or not provided, to facilitate movement of a cargo lid between a closed position and an opened position, and/or to facilitate selective locking of the cargo lid in one or more of the closed and opened positions.

It will be appreciated that one or more seal members and/or structures can be provided to facilitate sealing of the apertures 20, 120 by the respective cargo lids 50, 150 when the cargo lids 50, 150 are in the closed position, thereby substantially preventing dirt or debris from passing through the apertures 20, 120 when the cargo lids 50, 150 are each in a closed position. It will be appreciated that the cargo lids 50, 150 can be provided in any of a variety of suitable alternative embodiments. In one embodiment, a cargo lid (e.g., 50 and/or 150) and its interface, with a bed floor can be configured similarly to a closure member and bed floor as described in U.S. Pat. No. 6,880,875, issued Apr. 19, 2005, and entitled "Cargo Protecting System for a Pickup Truck."

A vehicle can include one or more folding seat assemblies which are associated with a utility bed. For example, in the embodiment of FIGS. 1-7, the utility vehicle 10 is shown to comprise the folding seat assemblies 30 and 130. The folding seat assemblies 30 and 130 can each be attached to the frame 12, such as with brackets (e.g., 36 in FIGS. 4-6) and movable links (e.g., 44 in FIGS. 4-6), such that the folding seat assemblies 30 and 130 are moveable with respect to the frame 12 between an erected position (shown in FIGS. 3 and 6-7) and a collapsed position (shown in FIGS. 1-2 and 4-5).

A folding seat assembly can be provided in any of a variety of suitable configurations. In the embodiment of FIGS. 1-7, the folding seat assembly 30 is shown to comprise a seat member 32 and a backrest member 34 which are movably coupled to one another (e.g., by way of an arm 42 shown in FIGS. 4-7 and which is movably supported by the bracket 36). Likewise, the folding seat assembly 130 is shown to comprise a seat member 132 and a backrest member 134 which are movably coupled to one another. For each of the folding seat assemblies 30, 130, each of the seat member 32, 132 and the backrest member 34, 134 can be configured to move with respect to the frame 12 when the folding seat assembly 30, 130 is moved between the erected position (shown in FIGS. 3 and 6-7) and the collapsed position (shown in FIGS. 1-2 and 4-5). It will be appreciated that any of a variety of handles or other controls (not shown) can be provided, or not provided, to facilitate movement of a folding seat assembly between a collapsed position and an erected position, and/or to facilitate selective locking of the folding seat assembly in one or more of the collapsed and erected positions. Each of the folding seat assemblies 30, 130, when in an erected position, can be configured to support a rearward-seated person (e.g., 90 in FIG. 6 with respect to the folding seat assembly 30).

When the folding seat assemblies 30, 130 are in a collapsed position (shown in FIGS. 1-2 and 4-5), it will be appreciated that neither the seat members 32, 132 nor the backrest members 34, 134 might extend into the apertures 20, 120 defined by the bed floor 16. The folding seat assemblies 30, 130 can be configured such that, when the utility bed 14 is in the hauling position with the cargo lids 50, 150 in the opened position and the folding seat assemblies 30, 130 in the erected position, portions of each of the seat members 32, 132 and portions of each of the backrest members 34, 134 extend into the respective apertures 20, 120 defined by the bed floor 16, as shown in FIG. 3 for example. In alternative embodiments, folding seat assemblies can be configured such that, when the utility bed is in the hauling position with the cargo lids are in the opened position and the folding seat assemblies in the erected position, the seat members of the folding seat assemblies might reside entirely beneath the aperture(s) defined by the bed floor of the vehicle.

Figure 6:
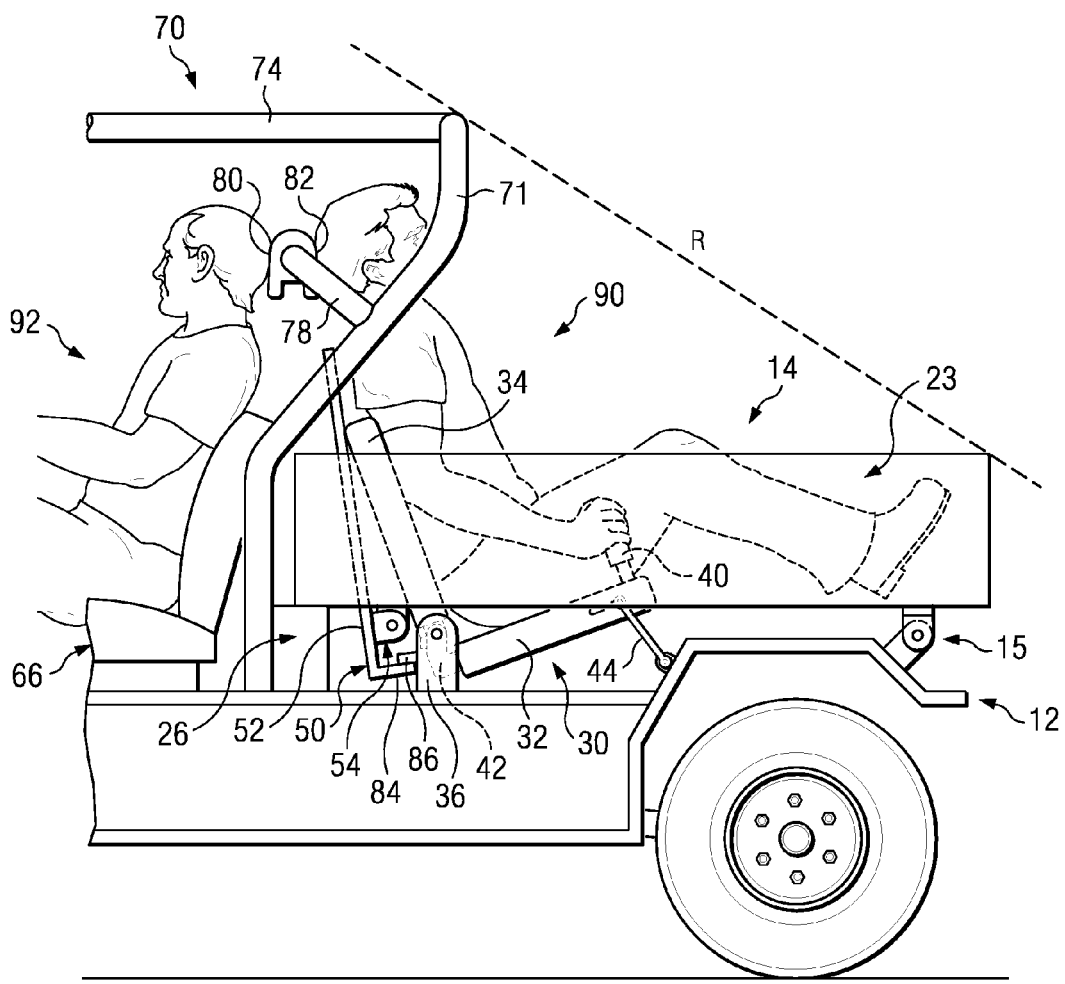
FIG. 6 is an enlarged side elevational view depicting a portion of the utility vehicle of FIG. 3 in association with multiple persons, wherein certain hidden components are shown in dashed lines.
Figure 7:
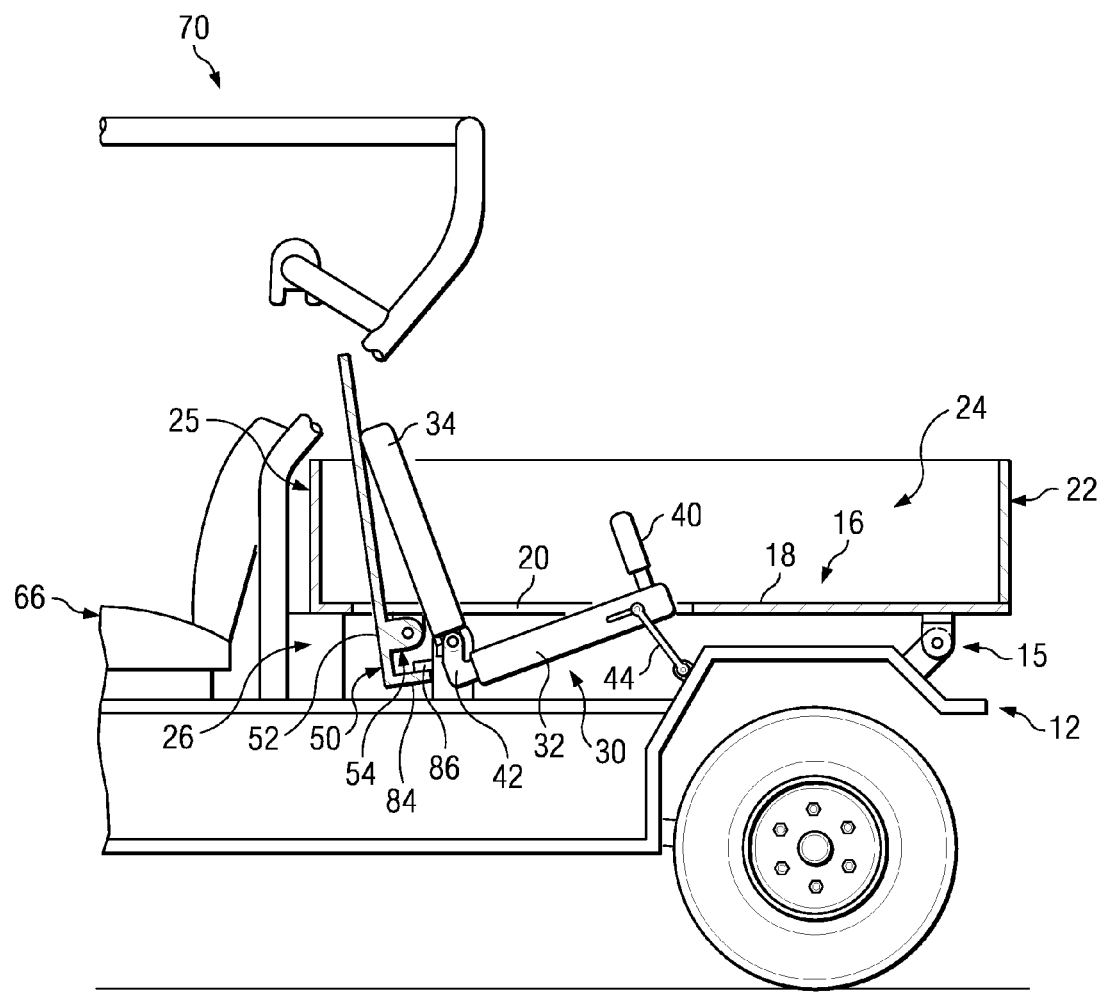
FIG. 7 is a side elevational view of the vehicle of FIG. 6, wherein the persons are not shown and certain components of the utility vehicle are shown in cross-section.

The utility vehicle 10 can also include an interlock arrangement that selectively prevents movement of the utility bed 14 from the hauling position to the dumping position. For example, in one embodiment, as shown in FIGS. 4-7, the interlock arrangement can comprise tabs 84 and 86 which are respectively attached to the cargo lid 50 and the frame 12 (e.g., by way of the bracket 36). When the utility bed 14 is in the hauling position and the cargo lid 50 is in an opened position, the interlock arrangement can be configured to prevent movement of the utility bed 14 from the hauling position to the dumping position. In particular, the tabs 84 and 86 can selectively engage one another, as shown in FIGS. 6-7, to prevent the utility bed 14 from moving from the hauling position to the dumping position. Also, in the embodiment of FIGS. 1-7, because the cargo lid 50 must be in the opened position to facilitate movement of the folding seat assembly 30 to the erected position while the utility bed 14 is in the hauling position, the interlock arrangement is also configured to prevent movement of the utility bed 14 from the hauling position to the dumping position when the folding seat assembly 30 is in the erected position.

It will be appreciated that a similar interlock arrangement can be associated with the cargo lid 150 and/or the folding seat assembly 130 such that the utility bed 14 can be prevented from moving to the dumping position when the cargo lid 150 is in the opened position and/or the folding seat assembly 130 is in the erected position. In an alternative embodiment, it will be appreciated that an interlock arrangement might not be coupled with a cargo lid, but will instead be coupled with a folding seat assembly, such that movement of an associated utility bed to a dumping position will not be inhibited if the cargo lid is in an opened position, but rather will only be inhibited when the folding seat assembly is in an erected position. It will also be appreciated that an interlock arrangement can be provided through use of any of a variety of alternative cooperating mechanical features or arrangements thereof.

Each of the folding seat assemblies 30, 130 can further comprise a seat belt assembly which can facilitate selective retention of a person seated upon the folding seat assembly 30, 130. For example, as shown in FIG. 3, the seat belt assembly associated with the folding seat assembly 30 can comprise a belt member 60 and a receiver member 62 which are each attached to the seat member 32. Likewise, the seat belt assembly associated with the folding seat assembly 130 can comprise a belt member 160 and a receiver member 162 which are each attached to the seat member 32. In an alternative embodiment, in addition to a lap belt configuration as generally shown in FIG. 3, it will be appreciated that a seat belt assembly might further include or define a shoulder strap. It will accordingly be appreciated that one or more portions of a seat belt assembly can be attached to a backrest member of a folding seat assembly. For example, a loop (not shown) can be attached to a backrest member of a folding seat assembly for receiving a portion of a seat belt to facilitate use of the seat belt in a shoulder strap configuration. In one embodiment, the loop can be positioned at an outer edge of the backrest member such that the shoulder strap can assist in effectively preventing a restrained person's torso from leaning out from a side of the utility bed. In another alternative embodiment, a seat belt assembly might, in part or whole, not be attached to a folding seat assembly, but rather to the frame 12, the bed floor 16, or other portion of a utility bed 14 of the utility vehicle 10.

In addition to seat belts, the utility bed of a utility vehicle can be provided with leg restraints (e.g., straps or the like, not shown). Leg restraints can be used by rearward-seated persons to selectively secure their legs within the utility bed so as to prevent their legs from escaping the utility bed during rollover of the utility vehicle. In one embodiment, the leg restraints can selectively deploy (e.g., such as when a folding seat assembly is moved from its collapsed position to its erected position) from beneath a bed floor and through apertures defined by the bed floor.

A vehicle can additionally include one or more handles which are configured to be grasped by a hand of a person seated upon a folding seat assembly. By grasping one or more of such handles, it will be appreciated that a person seated upon a folding seat assembly can better hold herself with respect to the folding seat assembly during movement of an associated vehicle. In addition, these handles can also help to prevent portions of a seated person from leaving the utility bed during motion or rollover of the utility vehicle. In one embodiment, such handles can be moveably attached to at least one of a frame, a utility bed, a folding seat assembly, and/or another portion of a vehicle. For example, in the embodiment of FIGS. 3 and 6-7, handles 38 and 40 are shown to be pivotally attached to the seat member 32 of the folding seat assembly 30, and handles 138 and 140 are shown to be pivotally attached to the seat member 132 of the folding seat assembly 130. Each of the handles 38, 40, 138, and 140 can be pivotable between a stored position and an extended position, and can include a molded hand grip.

The seat members 32 and 132 are shown to be provided with a pair of respective recesses 39, 41 and 139, 141 in the respective seat members 32 and 132. When the handles 38, 40, 138, 140 are in a stored position (e.g., shown with respect to the handles 38 and 40 in FIG. 3), the handles 38, 40, 138, 140 can be at least substantially (i.e., substantially or entirely) received within the respective recesses 39, 40, 139, 141 (e.g., also shown with respect to the handles 38 and 40 in FIG. 3). When the handles are in an extended position (e.g., shown in FIG. 3 with respect to the handles 138 and 140, and shown in FIGS. 6-7 with respect to the handle 40), the handles can be grasped by a person seated upon an associated folding seat assembly (e.g., shown in FIG. 6 with respect to the handle 40 and a right hand of the rearward-seated person 90). It will be appreciated that a handle can be movably attached to a seat member of a folding seat assembly in any of a variety of other suitable configurations. It will also be appreciated that a handle can additionally or alternatively be movably attached to a backrest member of a folding seat assembly, and/or to another portion of a folding seat assembly, utility bed, or other portion of a vehicle. Any of a variety of suitable mechanical interlock arrangements can be provided for selectively maintaining handles in stored or extended positions. Additionally, it will be appreciated that movement of a handle from a stored position to an extended position can (through suitable mechanical linkage) occur automatically upon movement of a folding seat assembly from a collapsed position to an erected position, or might alternatively require separate manual movement of the handle. A folding seat assembly might additionally or alternatively be provided with one or more armrests which can be attached to one or both of a seat member and a backrest member of the folding seat assembly, and which can selectively fold with respect to the folding seat assembly.

A vehicle can additionally be provided with a roll bar assembly. For example, the utility vehicle 10 is shown to include a roll bar assembly 70 which can be attached to the frame 12. In particular, the roll bar assembly 70 is shown to include side members 71 and 72, upper members 73, 74, and 75, a U-shaped member 76, and a headrest member 78 which are attached together (e.g., with welding and/or fasteners) to form a cage-type structure, as shown in FIG. 1. In one embodiment, such as in the configuration of FIG. 1, the roll bar assembly 70 can be configured to simultaneously protect persons respectively seated upon forward-facing seats 66 and 166 coupled with the frame 12 (e.g., forward facing person 92 shown in FIG. 6 with respect to forward-facing seat 66) and persons respectively seated upon the folding seat assemblies 30 and 130 (e.g., rearward facing person 90 shown in FIG. 6 with respect to folding seat assembly 30). With reference to FIG. 6, by overhanging both forward-seated persons (e.g., 92) and rearward-seated persons (e.g., 90), the roll bar assembly 70 can accordingly provide simultaneous rollover protection to both the forward-seated persons and the rearward-seated persons. For example, if the utility vehicle 10 were to roll over on a substantially flat ground surface about line "R" depicted in FIG. 6, it will be appreciated that the roll bar assembly 70 can protect the rearward-seated person 90 from directly contacting, and thus being injured by contact with, the ground surface. Though the location and configuration of each of the side members 71 and 72, the upper members 73, 74, and 75, the U-shaped member 76, and the headrest member 78 can be selected to facilitate such simultaneous protection of forward-seated and rearward-seated persons by the roll bar assembly 70, and are generally shown in FIGS. 1-6 as being configured to do so, it will be appreciated that a roll bar assembly can be provided in any of a variety of other suitable configurations which might or might not facilitate protection of forward-seated and rearward-seated persons upon a vehicle.

The roll bar assembly 70 can comprise front headrests 80, 180 and rear headrests 82, 182, as shown in FIG. 1. In particular, each of the front headrests 80, 180 and the rear headrests 82, 182 can be attached to the headrest member 78. Each of the front headrests 80, 180 can be configured for contacting and supporting a head of a respective person seated upon a respective one of the forward-facing seats 66, 166 (e.g., the forward-seated person 92 with respect to the forward-facing seat 66 in FIG. 6). Likewise, each of the rear headrests 82, 182 can be configured for contacting and supporting a head of a respective person seated upon a respective one of the folding seat assemblies 30, 130 (e.g., the rearward-seated person 90 with respect to the folding seat assembly 30 in FIG. 6). In one embodiment, as shown in FIGS. 1 and 6, the front headrest 80 can be adjacent to the rear headrest 180, and the front headrest 82 can be adjacent to the rear headrest 182. In another embodiment, such as shown in FIGS. 1 and 6, a common piece of cover and/or cushion material can provide at least part of both the front headrest 80 and the rear headrest 180, and another common piece of cover and/or cushion material can provide at least part of both the front headrest 82 and the rear headrest 182.

Unlike with respect to the utility vehicle 10 described above and shown in FIGS. 1-7, it will be appreciated that an alternative vehicle can include a folding seat assembly which is attached directly to a utility bed of the vehicle, as opposed to being attached to the frame of the vehicle. In such a configuration, the entire folding seat assembly can move together with the utility bed as the utility bed pivots between hauling and dumping positions. In this configuration, an interlock arrangement can be provided to prevent movement of the utility bed from the hauling position to the dumping position when the folding seat assembly is in the erected position. For example, respective portions of such an interlock arrangement can be attached to each of the folding seat assembly (and/or an associated cargo lid) and the frame of the vehicle. It will also be appreciated that a cargo lid can move independently of the folding seat assembly, or can alternatively be attached to a folding seat assembly. For example, in one embodiment, the cargo lid can be attached to, or even integral or unitary with, a backrest member or other portion of a folding seat assembly.

It will also be appreciated that the utility vehicle 10 can be easily converted by an operator of the utility vehicle 10 between a utility mode and a recreation mode. In the utility mode (e.g., see FIG. 1), the utility vehicle 10 can operate with the folding seats in collapsed positions, and with full capacity within the utility bed 14 for hauling cargo. In the recreation mode (e.g., see FIG. 3), the utility vehicle 10 can provide comfortable and effective seating for two additional passengers (i.e., seated within the folding seat assemblies 30, 130), as well as possibly some small/light cargo such as a cooler and/or fishing or hunting equipment. In this manner, the utility vehicle 10 can selectively provide additional seating for passengers, but without diminishing cargo-carrying capacity of the utility vehicle 10 when the additional seating is not required or erected. It will also be appreciated that the utility bed 14 can be provided with one or more steps (not shown) which can facilitate easy access to and egress from the utility bed 14 by passengers. In one embodiment, such a step can be attached to, integrated with, or otherwise associated with the tailgate 22.

Figure 8:
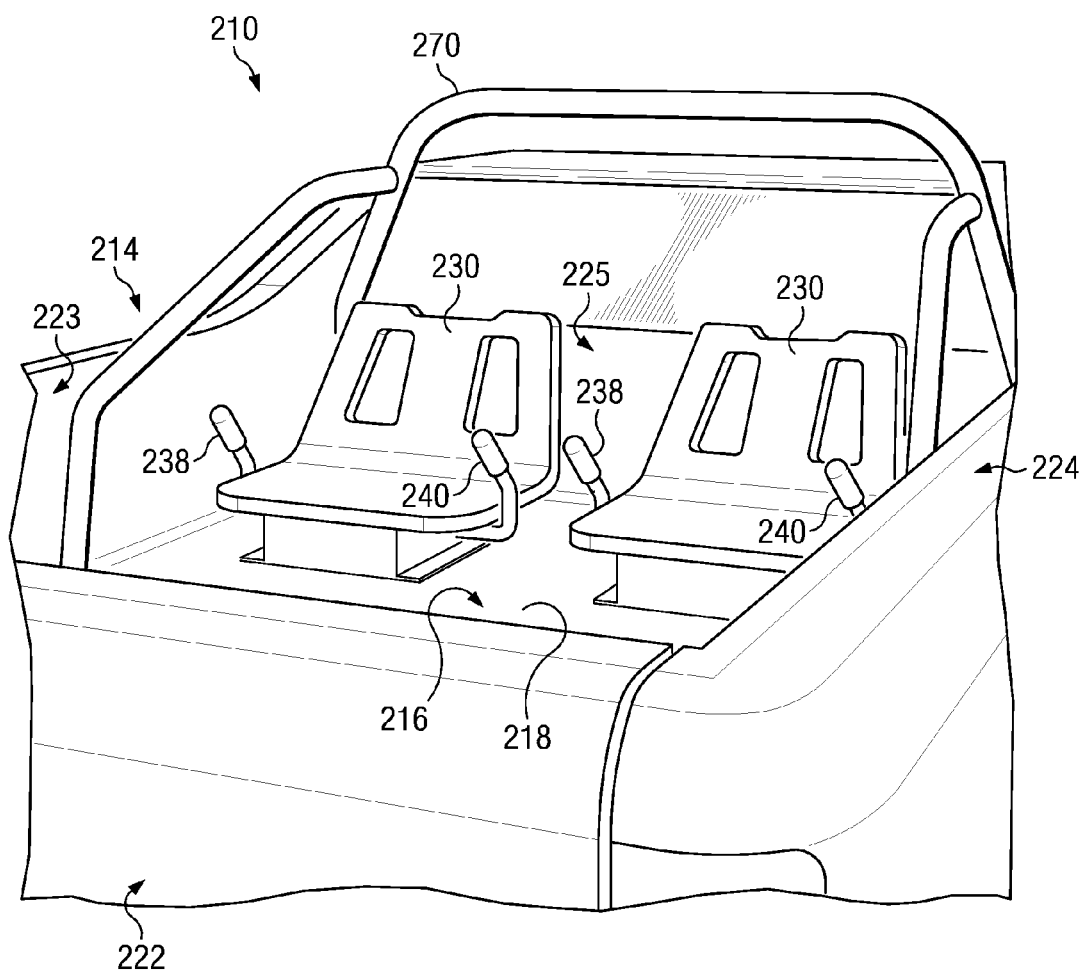
FIG. 8 is a rear perspective view depicting a portion of a conventional vehicle.

A portion of one conventional pickup truck 210, marketed under the registered trademarks SUBARU and BRAT, is depicted in FIG. 8 to include a utility bed 214 and a roll bar assembly 270. The utility bed 214 includes side walls 223, 224, and 225, as well as a pivotable tailgate 222 and a bed floor 216. The bed floor 216 has a cargo supporting surface 218, and two seats 230 are attached to the bed floor 216. Handles 238 and 240 are provided with molded hand grips to be grasped by hands of persons seated in the seats 230.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A vehicle comprising:
   a frame;
   a utility bed attached to the frame and moveable with respect to the frame between a hauling position and a dumping position, the utility bed comprising a bed floor and a cargo lid, the bed floor defining an aperture;
   a folding seat assembly moveable between an erected position and a collapsed position; and
   an interlock arrangement;
   wherein the cargo lid is movable between:
      a closed position in which the cargo lid at least substantially covers the aperture; and
      an opened position in which the cargo lid facilitates selective passage of at least a portion of the folding seat assembly into the aperture when both the utility bed is in the hauling position and the folding seat assembly is in the erected position; and
   wherein the interlock arrangement is configured to prevent movement of the utility bed from the hauling position to the dumping position when the folding seat assembly is in the erected position.

2. The vehicle of claim 1 wherein the bed floor comprises a first cargo supporting surface and the cargo lid comprises a second cargo supporting surface, and the second cargo supporting surface is generally coplanar with the first cargo supporting surface when the cargo lid is in the closed position.

3. The vehicle of claim 2 wherein, when the cargo lid is in the closed position, each of the first and second cargo supporting surfaces are configured to directly contact and provide underlying support for cargo.

4. The vehicle of claim 1 wherein the folding seat assembly comprises a seat member and a backrest member, and each of the seat member and the backrest member is configured to move with respect to the frame when the folding seat assembly is moved between the erected position and the collapsed position.

5. The vehicle of claim 4 wherein the folding seat assembly is configured such that, when the utility bed is in the hauling position, the cargo lid is in the opened position, and the folding seat assembly is in the erected position, portions of each of the seat member and the backrest member of the folding seat assembly extend into the aperture defined by the bed floor.

6. The vehicle of claim 4 wherein the folding seat assembly further comprises a seat belt assembly, the seat belt assembly comprising a belt member and a receiver member.

7. The vehicle of claim 4 wherein the folding seat assembly, when in the erected position, is configured to support a rearward-seated person.

8. The vehicle of claim 1 wherein the utility bed further comprises at least one side wall extending generally perpendicularly from adjacent to the bed floor.

9. The vehicle of claim 8 wherein the utility bed further comprises a tailgate, the tailgate being pivotally coupled with respect to the bed floor.

10. The vehicle of claim 1 further comprising at least one forward-facing seat and a roll bar assembly, the roll bar assembly being configured to simultaneously protect persons respectively seated upon each of the forward-facing seat and the folding seat assembly.

11. The vehicle of claim 10 wherein the roll bar assembly comprises a front headrest and a rear headrest, the front headrest is configured for supporting a head of a person seated upon the forward-facing seat, and the rear headrest is configured for supporting a head of a person seated upon the folding seat assembly.

12. The vehicle of claim 11 wherein the front headrest is adjacent to the rear headrest.

13. The vehicle of claim 1 further comprising a handle being moveably attached to at least one of the frame, the utility bed, and the folding seat assembly, wherein the handle is configured to be grasped by a person seated upon the folding seat assembly.

14. The vehicle of claim 13 wherein the handle is pivotally attached to a portion of the folding seat assembly and is pivotable between a stored position and an extended position.

15. The vehicle of claim 1 further comprising:
   a second folding seat assembly moveable between an erected position and a collapsed position;
   wherein the utility bed further comprises a second cargo lid, the bed floor defines a second aperture, and the second cargo lid is movable between:
      a closed position in which the second cargo lid at least substantially covers the second aperture; and
      an opened position in which the second cargo lid facilitates selective passage of at least a portion of the second folding seat assembly into the second aperture when both the utility bed is in the hauling position and the second folding seat assembly is in the erected position.

16. The vehicle of claim 1 wherein the cargo lid is hingedly coupled with the bed floor.

17. The vehicle of claim 16 wherein the interlock arrangement is further configured to prevent movement of the utility bed from the hauling position to the dumping position when the cargo lid is in the opened position.

18. A vehicle comprising:
   a frame;
   a folding seat assembly attached to the frame and moveable with respect to the frame between an erected position and a collapsed position;
   at least one forward-facing seat;
   a roll bar assembly configured to simultaneously protect persons respectively seated upon each of the forward-facing seat and the folding seat assembly; the roll bar assembly comprising:
      a front headrest configured for supporting a head of a person seated upon the forward-facing seat; and
      a rear headrest configured for supporting a head of a person seated upon the folding seat assembly;

a utility bed attached to the frame and moveable with respect to the frame between a hauling position and a dumping position, the utility bed comprising:
 a bed floor comprising a first cargo supporting surface and defining an aperture; and
 a cargo lid movable between:
  a closed position in which the cargo lid at least substantially covers the aperture; and
  an opened position in which the cargo lid facilitates selective passage of at least a portion of the folding seat assembly into the aperture when both the utility bed is in the hauling position and the folding seat assembly is in the erected position; and
 an interlock arrangement configured to prevent movement of the utility bed from the hauling position to the dumping position when the folding seat assembly is in the erected position.

19. The vehicle of claim 18 wherein the interlock arrangement is further configured to prevent movement of the utility bed from the hauling position to the dumping position when the cargo lid is in the opened position.

* * * * *